United States Patent

Brooke et al.

[15] 3,639,190
[45] Feb. 1, 1972

[54] MANUFACTURE OF SHEET MATERIAL

[72] Inventors: Thomas Andrew Brooke, Prescott; Peter Michael Robinson, Widnes, both of England

[73] Assignee: Dunlop Rubber Company Limited, London, England

[22] Filed: Aug. 6, 1969

[21] Appl. No.: 870,730

Related U.S. Application Data

[62] Division of Ser. No. 510,695, Nov. 30, 1965, Pat. No. 3,471,352.

[52] U.S. Cl. ................................................. 156/272, 264/26
[51] Int. Cl. ........................................ B29d 29/00, B29c 27/12
[58] Field of Search ............... 156/272, 274, 137, 139, 140, 156/273; 264/26; 219/10.41; 117/93.1

[56] References Cited

UNITED STATES PATENTS

| | | | |
|---|---|---|---|
| 2,280,771 | 4/1942 | Dufour et al. | 117/93.1 X |
| 2,296,372 | 9/1942 | Smith et al. | 156/137 X |
| 2,495,170 | 1/1950 | Kinn | 219/10.41 |
| 2,865,790 | 12/1958 | Baer | 117/93.1 |
| 3,042,568 | 7/1962 | Ludowici et al. | 156/137 |
| 3,190,998 | 6/1965 | Dyke | 264/26 X |

*Primary Examiner*—Carl D. Quarforth
*Assistant Examiner*—E. E. Lehmann
*Attorney*—Rauber & Lazar

[57] ABSTRACT

A method for use in the manufacture of mechanical belting, of molding a plastics material in which the temperature of the plastics material is first raised to a temperature below molding temperature by subjecting the plastics material to microwave energy at a frequency of at least 1,000 megacycles per second, and the temperature of the composition is then raised to molding temperature while compressing the belting between heated surfaces in a molding press.

3 Claims, No Drawings

MANUFACTURE OF SHEET MATERIAL

This is a division of application Ser. No. 510,695, filed Nov. 30, 1956.

This invention relates to the manufacture of sheet material, e.g., conveyor and transmission belting.

A method of vulcanizing conveyor and transmission belting comprises heating the belting in a press while under pressure. This may be carried out by two methods:

a. Flat Moulding Press.

This is the most commonly used method. A section of the belt to be vulcanized is placed between two flat metal surfaces which are heated by means of steam, hot water or electricity to sufficient temperature to vulcanize the rubber. During the heating, the section of belt between the metal platens is consolidated by pressure on these platens.

Depending on the thickness of the belt to be vulcanized, the length of time each section of belt is heated in the press can vary from 12 minutes to 60 minutes.

b. Continuous Press.

An alternative method of vulcanizing belting is to pass the belt through a continuous press so that the belt is heated and consolidated by pressure continuously instead of using a section-by-section method.

The normal operating speed of such a continuous press is between 1 and 4 ft./minute, depending on the thickness of the belt to be vulcanized.

It is an object of the present invention to reduce the vulcanization time required in either a section-by-section method, or a continuous method.

According to the invention a method of manufacturing sheet material from thermoplastic or thermosetting material comprises internally heating the sheet or a portion thereof by the application thereto of energy at microwave frequency, and further heating the said sheet or portion thereof by the application of heat by surface conduction.

Preferably the sheet or portion thereof is preheated by microwave energy, and subsequently heated by surface conduction. The method may be continuous where a length of sheet material is treated by the method according to the invention, the sheet being passed first through a microwave field and then into contact with and past a heated surface or surfaces. Alternatively, the method may be discontinuous where the sheet, or portion thereof is firstly heated in a microwave field while stationary, and then the sheet or portion thereof is moved into contact with a heated surface or surfaces for further heating by surface conduction.

In this specification "microwave" is used to denote a frequency of greater than 1,000 megacycles per second (mc./sec.). In a preferred form of the invention the frequency used lies in the range 1,000 to 5,000 mc./sec.

The invention also includes sheet material heated by the method referred to in the preceding two paragraphs.

In the method according to the invention, the inside of the belt is raised by the microwave heating stage to a higher temperature, in a given time, than the outside of the belt. On the other hand, in the press-moulding stage of the operation, the outside of the belt is heated more rapidly than the inside of the belt. The two methods of heating are combined to give (a) a more even distribution of heat, and thereby more even vulcanization, and (b) a lower time of vulcanization than is possible by either method alone.

In one embodiment of the invention, by way of example, a belt is internally preheated by microwave heating at a frequency of 2,450 mc./sec. to a temperature of 60°–100° C., and the heating is continued by conduction in either a flat press or a continuous press to raise the temperature of the belt to the final vulcanizing temperature (normally 130°–100° C.). Where a continuous press is used, the preheating can be carried out on a continuous basis and where a flat press is used one press length can be preheated before being drawn into the press.

This process of preheating can be applied to cord-reinforced or unreinforced bolts made of natural rubber or synthetic rubbers such as styrene butadiene, polyisoprene, polybutadiene or polychloroprene and can also be applied to plastic materials such as polyvinyl chloride, (p.v.c.).

A further application of this method of heating is in the pregelling of p.v.c.-coated fabric. In the manufacture of p.v.c.-covered conveyor belting, the fabric is spread with, or dipped in p.v.c. paste. The fabric coated with wet paste is then heated to pregell the p.v.c. in order to provide a dry material which can be handled. Microwave heating at a frequency of 2,450 mc./sec. is used to carry out this pregelling of the p.v.c. This method of heating has an unexpected advantage compared with normal methods of indirect heating such as by infrared rays. This advantage is of importance when using fabrics which consist of, or contain a percentage of synthetic fibers such as nylon, Terylene (Registered Trademark) or polypropylene (fabrics of this type are commonly used in the manufacture of p.v.c.-covered conveyor belting). This advantage is that the p.v.c. is heated sufficiently to pregell it with negligible heating of the synthetic fiber. As the fiber shrinks under heating causing reduction in fabric width with the possibility of distortion in the fabric, it is desirable not to heat the synthetic fiber at this stage of the processing.

With dielectric heating in the microwave frequency range the fabric of the belting is not heated dielectrically. The only way in which the fabric may be heated is by conduction and since the period of dielectric heating is short the amount of heat conducted to the fabric is negligible.

After pregelling of the p.v.c. the belting material is fully vulcanized in either a flat moulding press or a continuous press.

Having now described our invention, what we claim is:

1. A process for the manufacture of mechanical belting comprising a reinforcement structure and polyvinyl chloride, comprising of the steps:
   a. applying the polyvinyl chloride to the reinforcement structure;
   b. heating the polyvinyl chloride by means of microwave energy in the frequency range 1,000–5,000 megacycles per second thereby effecting pregelling of the polyvinyl chloride;
   c. passing the pregelled assembly into a platen press having heated platens; and
   d. closing the platens of the press thereby moulding and setting the polyvinyl chloride.

2. A process according to claim 1 wherein the polyvinyl chloride is applied in the form of a paste.

3. A process according to claim 1 wherein the reinforcement structure remains substantially unheated in the microwave heating stage.

* * * * *